(12) United States Patent
Yahaba et al.

(10) Patent No.: US 11,784,525 B2
(45) Date of Patent: Oct. 10, 2023

(54) COMPRESSOR

(71) Applicant: FUJITSU GENERAL LIMITED, Kanagawa (JP)

(72) Inventors: Shingo Yahaba, Kanagawa (JP); Kenshi Ueda, Kanagawa (JP); Tomoki Nishio, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 667 days.

(21) Appl. No.: 16/980,625

(22) PCT Filed: Apr. 17, 2019

(86) PCT No.: PCT/JP2019/016406
§ 371 (c)(1),
(2) Date: Sep. 14, 2020

(87) PCT Pub. No.: WO2019/208348
PCT Pub. Date: Oct. 31, 2019

(65) Prior Publication Data
US 2021/0013756 A1   Jan. 14, 2021

(30) Foreign Application Priority Data
Apr. 27, 2018   (JP) .................................. 2018-087268

(51) Int. Cl.
*H02K 1/32* (2006.01)
*F25B 31/00* (2006.01)
(Continued)

(52) U.S. Cl.
CPC ............. *H02K 1/32* (2013.01); *F25B 31/006* (2013.01); *H02K 1/276* (2013.01); *H02K 1/28* (2013.01)

(58) Field of Classification Search
CPC ............ H02K 1/32; H02K 1/276; H02K 1/28; H02K 1/2766; H02K 21/16; F25B 31/006; H05K 5/12; F04C 18/356; F04C 29/02
See application file for complete search history.

(56) References Cited

U.S. PATENT DOCUMENTS

2009/0293534 A1* 12/2009 Tanaka .................. F04C 29/026
62/470
2014/0134014 A1   5/2014 Mera et al.
(Continued)

FOREIGN PATENT DOCUMENTS

CN   103821717 A  *  5/2014   ......... F04C 18/0207
CN   103821717 A      5/2014
(Continued)

OTHER PUBLICATIONS

Oct. 11, 2021, Chinese Office Action issued for related CN Application No. 201980018468.4.

*Primary Examiner* — Emmanuel E Duke
(74) *Attorney, Agent, or Firm* — Paratus Law Group, PLLC (57) ABSTRACT

A rotor that gives rotational power to a compressor part that compresses refrigerant has a rotor core in which through-holes through which the refrigerant passes are formed, the through-holes having a cross section with a plurality of forks in a direction away from a rotation axis, a first end plate that covers a first end surface where one end of both end portions of the through-holes of the rotor core closer to the compressor part is formed, and an upper rotor end plate that covers a lower rotor end surface where the other end of the plurality of holes of the rotor core is formed. The first end plate has a first opening portion that causes the through-holes to communicate with an internal space. The upper rotor end plate has an upper opening portion that causes the through-holes to communicate with the internal space. The upper (Continued)

rotor end plate has projection portions that cover tip end portions, which are divided to respective forks, of the through-holes.

5 Claims, 6 Drawing Sheets

(51) Int. Cl.
*H02K 1/276* (2022.01)
*H02K 1/28* (2006.01)

(56) References Cited

U.S. PATENT DOCUMENTS

| | | |
|---|---|---|
| 2015/0318764 A1 | 11/2015 | Baba et al. |
| 2016/0329784 A1* | 11/2016 | Tamura .................... H02K 7/14 |
| 2018/0091011 A1 | 3/2018 | Higashino et al. |

FOREIGN PATENT DOCUMENTS

| | | |
|---|---|---|
| CN | 203813550 U | 9/2014 |
| CN | 107534361 A | 1/2018 |
| JP | H02-157492 A | 6/1990 |
| JP | 2008-228395 A | 9/2008 |
| JP | 2014-148916 A | 8/2014 |
| JP | 2019-122075 A | 7/2019 |

* cited by examiner

COMPRESSOR

CROSS REFERENCE TO PRIOR APPLICATION

This application is a National Stage Patent Application of PCT International Patent Application No. PCT/JP2019/016406 (filed on Apr. 17, 2019) under 35 U.S.C. § 371, which claims priority to Japanese Patent Application No. 2018-087268 (filed on Apr. 27, 2018), which are all hereby incorporated by reference in their entirety.

FIELD

The technique of the present disclosure relates to a compressor.

BACKGROUND

A sealed compressor in which a compressor part and a motor part are housed inside a sealed container is known. The motor part (electric motor part) includes a stator and a rotor. The stator generates a rotating magnetic field to rotate the rotor. The compressor part compresses refrigerant as the rotor is rotated. The rotor is formed with a plurality of through-holes through which the refrigerant compressed by the compressor part passes. Refrigerator oil that lubricates the compressor part is stored in the sealed container, passes through the plurality of through-holes together with the refrigerant compressed by the compressor part, and is discharged together with the refrigerant to a subsequent-stage device. Such a compressor can prevent the refrigerator oil stored in the sealed container from being decreased by suppressing that the refrigerator oil passes through the plurality of through-holes, and thereby appropriately lubricate the compressor part.

As a technique of such a compressor, there is a technique in the related art in which a gas flow path that is formed to penetrate a rotor core and extends in an axial direction of a rotation axis is provided, a projection portion that projects to the gas flow path is provided to a boundary plate and an end plate of the rotor core, and thereby the refrigerator oil is separated from the refrigerant. Further, a compressor has been proposed which has a rotor in which refrigerant flow holes are formed and end plates provided on both end sides of the rotor in the axial direction and in which an opening portion of the end plate as formed to expose a region of an end surface of the rotor core closer to the rotation axis than the refrigerant flow holes (refer to Patent Literatures 1 and 2).

CITATION LIST

Patent Literature

Patent Literature 1: JP 2008-228395 A
Patent Literature 2: JP 2019-122075 A

SUMMARY

Technical Problem

However, such a compressor has a problem that the efficiency of the system is reduced when the refrigerator oil passes through the plurality of through-holes and projects to the subsequent-stage device together with the refrigerant. On the other hand, the inventors of the present application have recognized the problem that if the projection portion is simply provided to the end plate, a flow path resistance of the refrigerant flow passage is increased so that a flow rate of the refrigerant is decreased, and the efficiency of a refrigeration cycle apparatus provided with the compressor is reduced, as in Patent Literature 1.

The disclosed technique has been made in view of the above circumstances, and an object thereof is to provide a compressor that reduces an oil discharge amount while suppressing a flow path resistance when a refrigerant passes through a through-hole formed in a rotor.

Solution to Problem

A compressor disclosed in this application, according to an aspect, includes: a rotor; a stator that rotates the rotor around a rotation axis; a compressor part that compresses refrigerant by rotation of the rotor; and a sealed container that forms an internal space in which the rotor, the stator, and the compressor part are housed, wherein the rotor has a rotor core in which a plurality of holes through which the refrigerant passes are formed, a first end plate that covers a first end surface where one end of both end portions of the plurality of holes of the rotor core closer to the compressor part is formed, and a second end plate that covers a second end surface where the other end of the plurality of holes of the rotor core is formed, the first end plate has a first opening portion that causes the plurality of holes to communicate with the internal space, the second end plate has a second opening portion that causes the plurality of holes to communicate with the internal space, and a plurality of projection portions that cover a region of the other end of the hole distant from the rotation axis are formed.

Advantageous Effects of Invention

The disclosed compressor can reduce the oil discharge amount while suppressing the flow path resistance.

DESCRIPTION OF EMBODIMENTS

Hereinafter, a compressor according to an embodiment disclosed in the present application will be described with reference to the drawings. Note that, the technique of the present disclosure is not limited to the following description. Further, in the following description, the same constituents will be given the same reference numerals and the duplicated description omitted.

Embodiment

Figure 1:
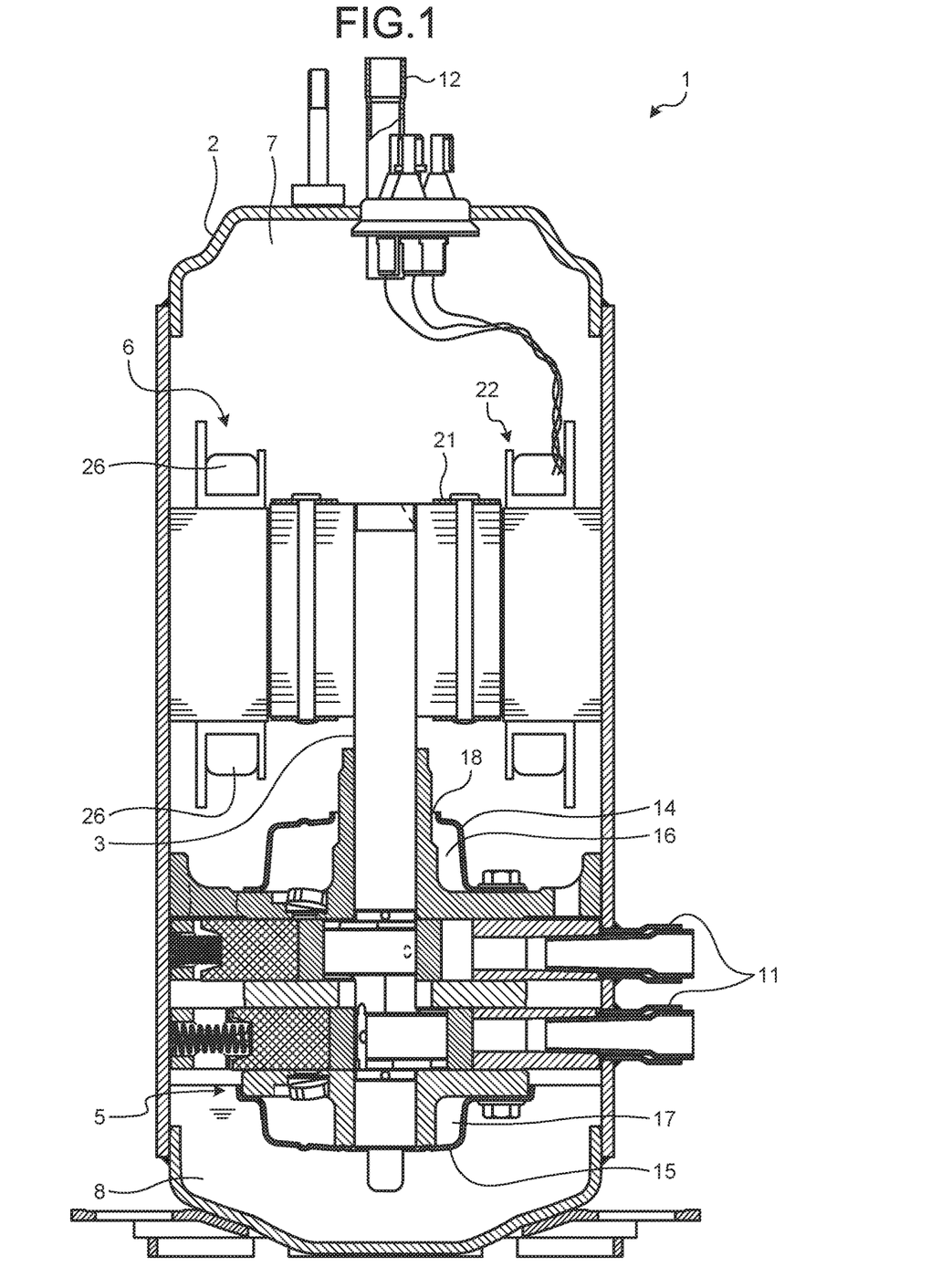
FIG. 1 is a vertical sectional view illustrating a compressor of a first embodiment.

FIG. 1 is a vertical sectional view illustrating a compressor 1 of a first embodiment. As illustrated in FIG. 1, the compressor 1 includes a container 2, a shaft 3, a compressor part 5, and a motor part 6. The container 2 forms a sealed internal space 7. The internal space 7 is formed in a substantially columnar shape. The compressor 1 is formed such that the axis of the cylinder of the internal space 7 is parallel to a vertical direction when the container 2 is placed vertically on a horizontal plane. In the container 2, an oil sump 8 is formed in a lower portion of the internal space 7. Refrigerator oil for lubricating the compressor part 5 is stored in the oil sump 8. A suction pipe 11 and a discharge pipe 12 are connected to the container 2. The shaft 3 is formed in a rod shape, and is disposed in the internal space 7 of the container 2 such that one end thereof is disposed in the oil sump 8. The shaft 3 is supported by the container 2 so as to be rotatable around a rotation axis that is parallel to the axis of the cylinder formed by the internal space 7. The refrigerator oil stored in the oil sump 8 is supplied to the compressor part 5 by the rotation of the shaft 3.

The compressor part 5 is disposed in the lower portion of the internal space 7, and is disposed above the oil sump 8. The compressor 1 further includes an upper muffler cover 14 and a lower muffler cover 15. The upper muffler cover 14 is disposed above the compressor part 5 in the internal space 7. The upper muffler cover 14 forms an upper muffler chamber 16 therein. The lower muffler cover 15 is disposed below the compressor part 5 in the internal space 7, and is disposed above the oil sump 8. The lower muffler cover 15 forms a lower muffler chamber 17 therein. The lower muffler chamber 17 communicates with the upper muffler chamber 16 via a communication passage (not illustrated) formed in the compressor part 5. A compressed refrigerant discharge hole 18 is formed between the upper muffler cover 14 and the shaft 3, and the upper muffler chamber 16 communicates with the internal space 7 via the compressed refrigerant discharge hole 18.

The compressor part 5 is a so-called rotary type compressor, which compresses the refrigerant supplied from the suction pipe 11 by the rotation of the shaft 3, and supplies the compressed refrigerant to the upper muffler chamber 16 and the lower muffler chamber 17. The refrigerant is compatible with refrigerator oil.

The motor part 6 is disposed above the compressor part 5 in the internal space 7. The motor part 6 includes a rotor 21 and a stator 22. The rotor 21 is fixed to the shaft 3. The stator 22 is formed in a substantially cylindrical shape, is disposed so as to surround the rotor 21, and is fixed to the container 2. The stator 22 includes windings 26. The stator 22 generates a rotating magnetic field to rotate the rotor 21 when a single-phase or three-phase voltage is appropriately applied to the windings 26.

Rotor 21

Figure 2:
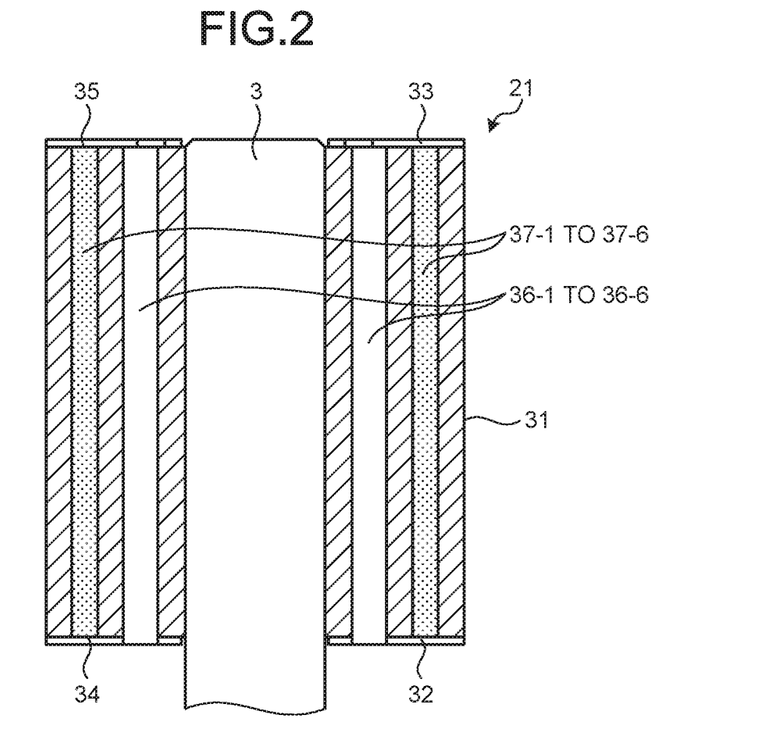
FIG. 2 is a sectional view illustrating a rotor of the compressor of the first embodiment.

FIG. 2 is a sectional view illustrating the rotor 21 of the compressor 1 of the first embodiment. As illustrated in FIG. 2, the rotor 21 includes a rotor core 31, a lower rotor end plate 32, and an upper rotor end plate 33. The rotor core 31 is formed in a substantially columnar shape, and is formed by stacking a plurality of steel plates formed of a soft magnetic material such as a silicon steel plate. The rotor core 31 is fixed to the shaft 3 such that the axis of the cylinder formed by the rotor core 31 overlaps the rotation axis of the shaft 3. Further, the rotor core 31 has a lower rotor end surface 3-1, an upper rotor end surface 35, and a plurality of through-holes 36-1 to 36-6.

The lower rotor end surface 34 is formed at a portion corresponding to one bottom surface of the cylinder formed by the rotor core 31, and is formed at a portion of the rotor core 31 facing the compressor part 5. The upper rotor end surface 35 is formed at a portion corresponding to the other bottom surface of the cylinder formed by the rotor core 31, and is formed on a side of the rotor core 31 opposite to the side where the lower rotor end surface 34 is formed. The plurality of through-holes 36-1 to 36-6 are formed parallel to the rotation axis of the shaft 3, and are arranged around the shaft 3 at equal intervals. The plurality of through-holes 36-1 to 36-6 are formed so as to penetrate the lower rotor end surface 34 and the upper rotor end surface 35.

The lower rotor end plate 32 is formed in a substantially disc shape. The lower rotor end plate 32 is fixed to the rotor core 31 to be in close contact with the lower rotor end surface 34 so as to cover the lower rotor end surface 34 of the rotor core 31. The upper rotor end plate 33 is formed in a substantially disc shape. The upper rotor end plate 33 is fixed to the rotor core 31 to be in close contact with the upper rotor end surface 35 so as to cover the upper rotor end surface 35 of the rotor core 31.

The rotor 21 further includes permanent magnets 37-1 to 37-6 and a balancer (not illustrated). The permanent magnets 37-1 to 37-6 and the balancer are fixed to the rotor core 31 by the lower rotor end plate 32 and the upper rotor end plate 33 being fixed to the rotor core 31. The permanent magnets 37-1 to 37-6 are provided so that the rotor 21 is rotated by the rotating magnetic field generated by the stator 22. The balancer provided so that the rotor 21 is rotated around the rotation axis, that is, the center of gravity of the rotor 21 overlaps the rotation axis of the shaft 3.

Figure 3A:
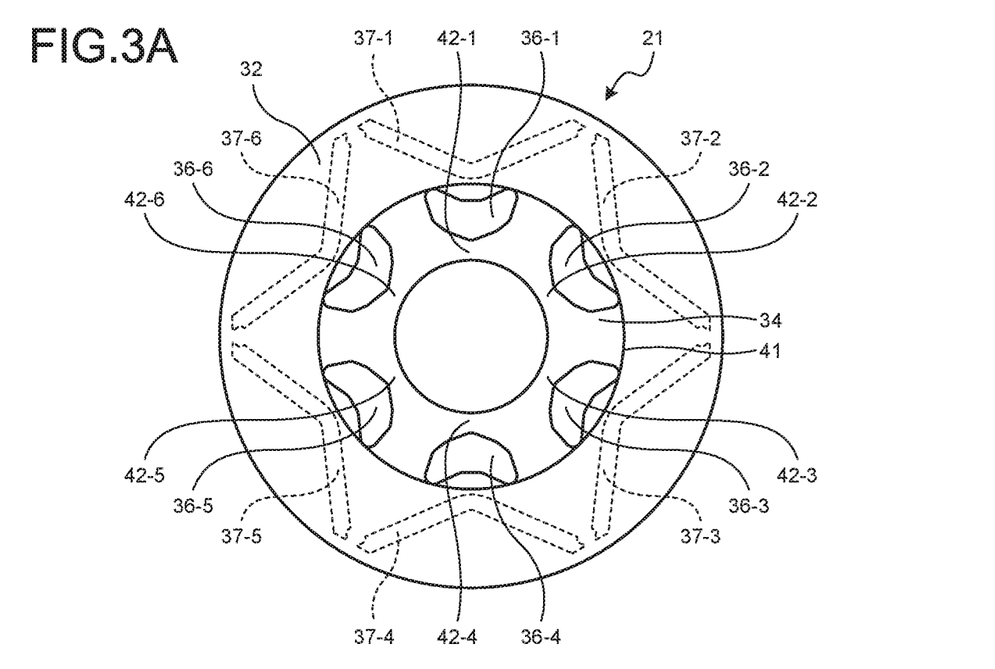
FIG. 3A is a bottom view illustrating the rotor of the compressor of the first embodiment.
Figure 3B:
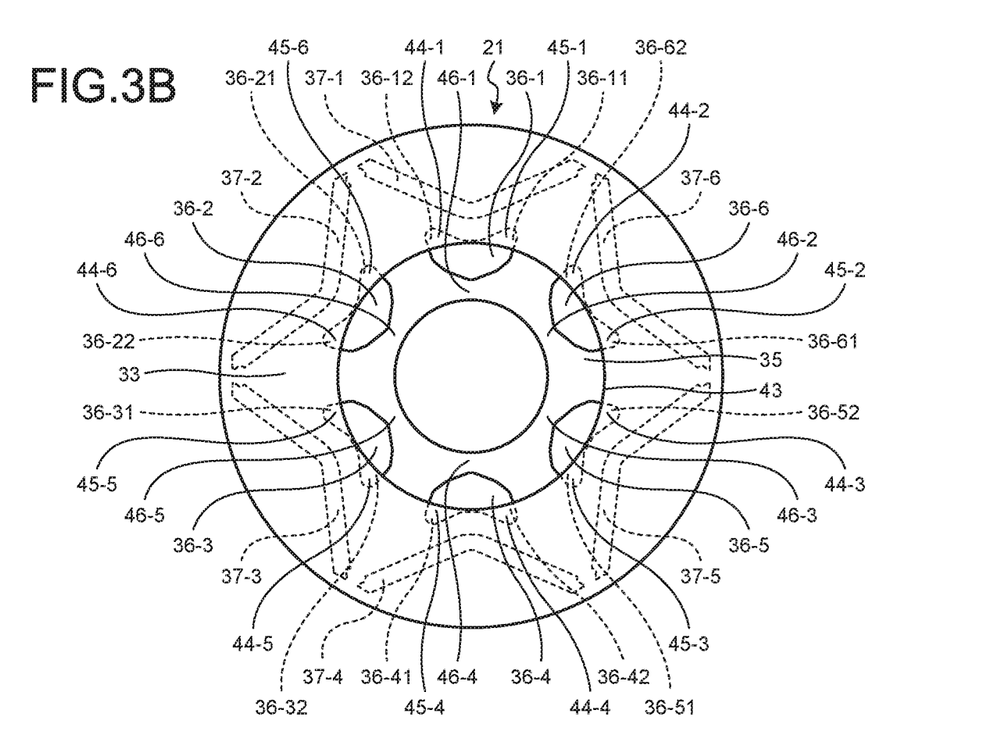
FIG. 3B a top view illustrating the rotor of the compressor of the first embodiment.

FIG. 3A is a bottom view illustrating the rotor 21 of the compressor 1 of the first embodiment, and FIG. 3B is a top view illustrating the rotor 21 of the compressor 1 of the first embodiment. In FIGS. 3A and 3B, members covered by the lower rotor end plate 32 and the upper rotor end surface 35 are illustrated by broken lines in a see-through manner for easily understanding.

The permanent magnets 37-1 to 37-6 included in the rotor 21 have a V-shape, as illustrated in FIGS. 3A and 3B. Further, the permanent magnets 37-1 to 37-6 are disposed such that a projection direction of the bent portion of the V-shape is directed to the center of the rotor 21, that is, toward the rotation axis. The permanent magnets 37-1 to 37-6 are arranged around the shaft 3 at equal intervals of 60° mechanical angle in a circumferential direction. The permanent magnets 37-1 to 37-6 are arranged such that ends of the adjacent permanent magnets are adjacent to each other, and are disposed to form a star shape when viewed as a whole of the permanent magnets. By disposing the permanent magnets in a star shape (V-shape), larger permanent magnets 37-1 to 37-6 can be disposed in the rotor 21 and a stronger magnetic force can be secured as compared with a case where the permanent magnets are disposed in a plate shape instead of a V-shape.

Opening portions of the plurality of through-holes 36-1 to 36-6 provided in the rotor 21 have a V-shape. In other words, the opening portions of the plurality of through-holes 36-1 to 36-6 have a biforked shape. Further, the through-holes 36-1 to 36-6 are disposed such that a projection direction of the bent portion of the V-shape is directed to the center of the rotor 21, that is, toward the rotation axis.

That is, in each of the permanent magnet 37-1 and the through-hole 36-1, the projection direction of the bent portion of the V-shape is directed toward the rotation axis of the rotor 21. Then, the permanent magnet 37-1 and the through-hole 36-1 are disposed such that the permanent magnet 37-1 and the through-hole 36-1 are parallel to a direction in which the rotation axis extends, that is, the axial direction of the rotation axis, and the permanent magnet 37-1 and the through-hole 36-1 overlap in a radial direction toward the outer periphery. In each of the permanent magnet 37-2 and the through-hole 36-2, the projection direction of the bent portion of the V-shape is directed toward the rotation axis of the rotor 21. Then, the permanent magnet 37-2 and the through-hole 36-2 are disposed such that the permanent magnet 37-2 and the through-hole 36-2 are parallel to the axial direction of the rotation axis, and the permanent magnet 37-2 and the through-hole 36-2 overlap in the radial direction toward the outer periphery. In each of the permanent magnet 37-3 and the through-hole 36-3, the projection direction of the bent portion of the V-shape is directed toward the rotation axis of the rotor 21. Then, the permanent magnet 37-3 and the through-hole 36-3 are disposed such that the permanent magnet 37-3 and the through-hole 36-3 are parallel to the axial direction of the rotation axis, and the permanent magnet 37-3 and the through-hole 36-3 overlap in the radial direction toward the outer periphery. In each of the permanent magnet 37-4 and the through-hole 36-4, the projection direction of the bent portion of the V-shape is directed toward the rotation axis of the rotor 21. Then, the permanent magnet 37-4 and the through-hole 36-4 are disposed such that the permanent magnet 37-4 and the through-hole 36-4 are parallel to the axial direction of the rotation axis, and the permanent magnet 37-4 and the through-hole 36-4 overlap in the radial direction toward the outer periphery. In each of the permanent magnet 37-5 and the through-hole 36-5, the projection direction of the bent portion of the V-shape is directed toward the rotation axis of the rotor 21. Then, the permanent magnet 37-5 and the through-hole 36-5 are disposed such that the permanent magnet 37-5 and the through-hole 36-5 are parallel to the axial direction of the rotation axis, and the permanent magnet 37-5 and the through-hole 36-5 overlap in the radial direction toward the outer periphery. In each of the permanent magnet 37-6 and the through-hole 36-6, the projection direction of the bent portion of the V-shape is directed toward the rotation axis of the rotor 21. Then, the permanent magnet 37-6 and the through-hole 36-6 are disposed such that the permanent magnet 37-6 and the through-hole 36-6 are parallel to the axial direction of the rotation axis, and the permanent magnet 37-6 and the through-hole 36-6 overlap in the radial direction toward the outer periphery.

In the lower rotor end plate 32, a lower opening portion 41 is formed, as illustrated in FIG. 3A. The lower opening portion 41 is formed in a circular shape. The shaft 3 penetrates the lower opening portion 41 when the rotor 21 is fixed to the shaft 3. The lower opening portion 41 allows all of the lower ends of the plurality of through-holes 36-1 to 36-6 on the lower rotor end surface 34 side to be open to the internal space 7, and causes each of the plurality of through-holes 36-1 to 36-6 to communicate with the internal space 7.

The lower rotor end surface 34 includes a plurality of lower inner peripheral side adjacent regions 42-1 to 42-6. The plurality of lower inner peripheral side adjacent regions 42-1 to 42-6 are disposed on the inner peripheral side of the plurality of through-holes 36-1 to 36-6, and are adjacent to the plurality of through-holes 36-1 to 36-6, respectively.

That is, the lower inner peripheral side adjacent region 42-1 is disposed on the inner peripheral side of the through-hole 36-1 and is adjacent to the through-hole 36-1. The lower inner peripheral side adjacent region 42-2 is disposed on the inner peripheral side of the through-hole 36-2 and is adjacent to the through-hole 36-2. The lower inner peripheral side adjacent region 42-3 is disposed on the inner peripheral side of the through-hole 36-3 and is adjacent to the through hole 36-3. The lower inner peripheral side adjacent region 42-4 is disposed on the inner peripheral side of the through-hole 36-4 and is adjacent to the through-hole 36-4. The lower inner peripheral side adjacent region 42-5 is disposed on the inner peripheral side of the through-hole 36-5 and is adjacent to the through-hole 36-5. The lower inner peripheral side adjacent region 42-6 is disposed on the inner peripheral side of the through-hole 36-6 and is adjacent to the through-hole 36-6. The lower opening portion 41 exposes all of the plurality of lower inner peripheral side adjacent regions 42-1 to 42-6 to the internal space 7.

Since the lower opening portion 41 is formed of one hole, the lower rotor end plate 32 can be more easily manufactured as compared with a structure in which the lower opening portion is formed of a plurality of holes. Since the lower rotor end plate 32 can be easily manufactured, such a compressor 1 can be easily manufactured as a whole.

Furthermore, the lower rotor end plate 32 covers all regions adjacent to the plurality of through-holes 36-1 to 36-6, other than the region of the lower rotor end surface 34 exposed to the internal space 7 by the lower opening portion 41. For example, the lower rotor end plate 32 covers the permanent magnets 37-1 to 37-6 to prevent the permanent magnets 37-1 to 37-6 from coming off the rotor 21.

In the upper rotor end plate 33, an upper opening portion 43 is formed, as illustrated in FIG. 3B. The upper opening portion 43 is formed in a circular shape. The upper opening portion 43 exposes an upper end of the shaft 3 to the internal space 7 when the rotor 21 is fixed to the shaft 3.

The upper rotor end plate 33 covers each of tip end portions 36-11 to 36-62 divided in a biforked manner of the V-shape of the upper ends of the plurality of through-holes 36-1 to 36-6 on the upper rotor end surface 35 side. Here, the tip end portion divided in a biforked manner represents both end portions of the V-shape formed by the hole. In the following, the tip end portion divided in a biforked manner may be simply referred to as a "biforked tip end portion". A portion where the upper rotor end plate 33 covers the biforked tip end portions 36-11 to 36-62 is called a projection portion. That is, the upper rotor end plate 33 includes a plurality of projection portions 44-1 to 44-6 and 45-1 to 45-6.

In the present embodiment, as illustrated in FIG. 3B, the upper rotor end plate 33 covers a region from a position, which connects a concave-side apex of a bent part of the V-shape of the upper ends of the through-holes 36-1 to 36-6 to a point between a projection-side apex of the bent part and the biforked tip end portion, to the biforked tip end portion. The upper opening portion 43 allows a part of the upper ends of the plurality of through-holes 36-1 to 36-6 on the upper rotor end surface 35 side, which includes the bent part of the V-shape, to be open to the internal space 7, respectively, and causes each of the through-holes 36-1 to 36-6 to communicate with the internal space 7. The upper opening portion 43 further exposes all of the plurality of upper inner peripheral side adjacent regions 46-1 to 46-6 to the internal space 7.

The plurality of projection portions 44-1 to 44-6 and 45-1 to 45-6 cover the biforked tip end portions of the upper ends of the plurality of through-holes 36-1 to 36-6, respectively. That is, the projection portion 44-1 covers the tip end portion 36-11 on the left side of the biforked portion of the opening formed by the upper end of the through-hole 36-1 when the upper rotor end surface 35 is viewed from the axial direction of the rotation axis. The projection portion 44-2 covers the tip end portion 36-21 on the left side of the biforked portion of the opening formed by the upper end of the through-hole 36-2 when the upper rotor end surface 35 is viewed from the axial direction of the rotation axis. The projection portion 44-3 covers the tip end portion 36-31 on the left side of the biforked portion of the opening formed by the upper end of the through-hole 36-3 when the upper rotor end surface 35 is viewed from the axial direction of the rotation axis. The projection portion 44-4 covers the tip end portion 36-41 on the left side of the biforked portion of the opening formed by the upper end of the through-hole 36-4 when the upper rotor end surface 35 is viewed from the axial direction of the rotation axis. The projection portion 44-5 covers the tip end portion 36-51 on the left side of the biforked portion of the opening formed by the upper end of the through-hole 36-5 when the upper rotor end surface 35 is viewed from the axial direction of the rotation axis. The projection portion 44-6 covers the tip end portion 36-61 on the left side of the biforked portion of the opening formed by the upper end of the through-hole 36-6 when the upper surface rotor end surface 35 is viewed from the axial direction of the rotation axis.

Further, the projection portion 45-1 covers the tip end portion 36-12 on the right side of the biforked portion of the opening formed by the upper end of the through-hole 36-1 when the upper rotor end surface 35 is viewed from the axial direction of the rotation axis. The projection portion 45-2 covers the tip end portion 36-22 on the right side of the biforked portion of the opening formed by the upper end of the through-hole 36-2 when the upper rotor end surface 35 is viewed from the axial direction of the rotation axis. The projection portion 45-3 covers the tip end portion 36-32 on the right side of the biforked portion of the opening formed by the upper end of the through-hole 36-3 when the upper rotor end surface 35 is viewed from the axial direction of the rotation axis. The projection portion 45-4 covers the tip end portion 36-42 on the right side of the biforked portion of the opening formed by the upper end of the through-hole 36-4 when the upper rotor end surface 35 is viewed from the axial direction of the rotation axis. The projection portion 45-5 covers the tip end portion 36-52 on the right side of the biforked portion of the opening formed by the upper end of the through-hole 36-5 when the upper rotor end surface 35 is viewed from the axial direction of the rotation axis. The projection portion 45-6 covers the tip end portion 36-62 on the right side of the biforked portion of the opening formed by the upper end of the through-hole 36-6 when the upper rotor end surface 35 is viewed from the axial direction of the rotation axis.

Operation of Compressor 1

The compressor 1 is provided in a refrigeration cycle apparatus (not illustrated), and is used for compressing the refrigerant and circulating the refrigerant in the refrigeration cycle apparatus. The motor part 6 of the compressor 1 generates a rotating magnetic field when a single-phase or three-phase voltage is applied to the windings 26 of the stator 22. The rotor 21 is rotated by the rotating magnetic field generated by the stator 22, and accordingly, the shaft 3 is rotated.

When the shaft 3 is rotated, the compressor part 5 suctions a low-pressure refrigerant gas through the suction pipe 11, compresses the suctioned low-pressure refrigerant gas to generate a high-pressure refrigerant gas, and supplies the high-pressure refrigerant gas to the upper muffler chamber 16 and the lower muffler chamber 17. The lower muffler cover 15 reduces pressure pulsations of the high-pressure refrigerant gas supplied to the lower muffler chamber 17, and supplies the high-pressure refrigerant gas with the reduced pressure pulsations to the upper muffler chamber 16. The upper muffler cover 14 reduces pressure pulsations of the high-pressure refrigerant gas supplied to the upper muffler chamber 16, and supplies the high-pressure refrigerant gas with the reduced pressure pulsations to a space between the compressor part 5 and the motor part 6 in the internal space 7 through the compressed refrigerant discharge hole 18. The high-pressure refrigerant gas supplied to the space between the compressor part 5 and the motor part 6 in the internal space 7 passes through the plurality of through-holes 36-1 to 36-6 to be supplied to a space above the motor part 6 in the internal space 7. The refrigerant supplied to the space above the motor part 6 in the internal space 7 is discharged to the subsequent-stage device of the refrigeration cycle apparatus through the discharge pipe 12.

Figure 4:
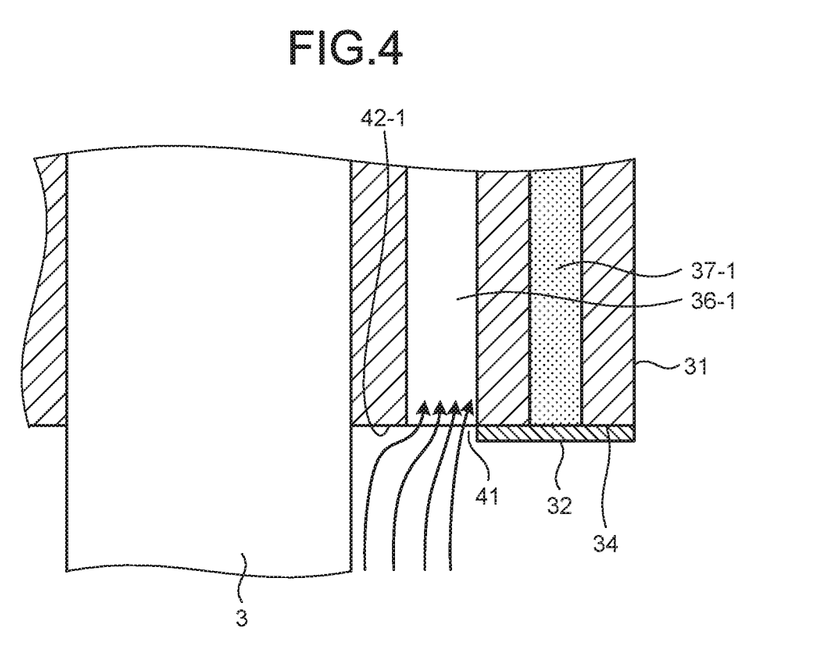
FIG. 4 is an enlarged sectional view illustrating the vicinity of a biforked tip end portion of an opening formed by a lower end of a through-hole 36-1.

FIG. 4 is an enlarged sectional view illustrating the vicinity of the biforked tip end portion or the opening formed by the lower end of the through-hole 36-1. The high-pressure refrigerant gas flowing out from the compressed refrigerant discharge hole 18 rises along the shaft 3, advances obliquely from the shaft 3 side toward the outer peripheral side as illustrated in FIG. 4, and enters the inside of the through-hole 36-1. The lower rotor end plate 32 exposes the plurality of lower inner peripheral side adjacent regions 42-1 to 42-6 to the internal space 7 to be less likely to interfere with the high-pressure refrigerant gas that obliquely enters the inside of the through-hole 36-1 from the shaft 3 side. Therefore, the motor part 6 of the compressor 1 can reduce the resistance received when the high-pressure refrigerant gas enters the inside of the through-hole 36-1 from the lower portion of the motor part 6 in the internal space 7, and reduce the pressure loss when the high-pressure refrigerant gas enters the inside of the through-hole 36-1. In the compressor 1, since the plurality of lower inner peripheral side adjacent regions 42-1 to 42-6 are exposed, the length of the flow path connecting the lower portion and the upper portion of the motor part 6 via the plurality of through-holes 36-1 to 36-6 can be shortened by the thickness of the lower rotor end plate 32. In the compressor 1, since the length of the flow path is short, the flow path resistance of the high-pressure refrigerant gas passing through the flow path can be reduced, and the pressure loss when the high-pressure refrigerant gas passes through the flow path can be reduced. In the compressor 1, since the pressure loss when the high-pressure refrigerant gas passes through the flow path is reduced, a decrease in pressure of the refrigerant discharged to the subsequent-stage device can be suppressed, and the refrigerant can be compressed with high efficiency.

Figure 5:
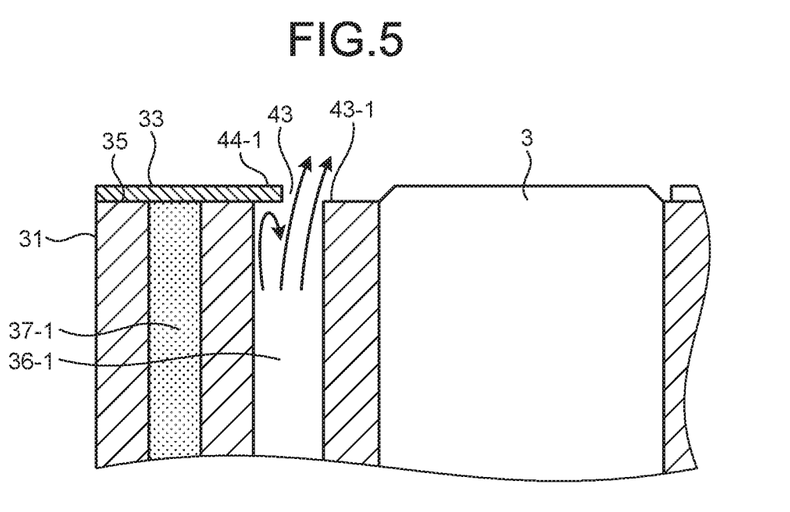
FIG. 5 is an enlarged sectional view illustrating the vicinity of a biforked tip end portion of an opening formed by an upper end of the through-hole 36-1.

FIG. 5 is an enlarged sectional view illustrating the vicinity of the biforked tip end portion of the opening formed by the upper end of the through-hole 36-1. When the high-pressure refrigerant gas passes through the through-hole 36-1, the high-pressure refrigerant gas collides with the projection portion 44-1 as illustrated in FIG. 5, and flows obliquely from the upper end opening portion of the through-hole 36-1 toward the rotation axis of the shaft 3. The upper rotor end plate 33 exposes the upper inner peripheral side adjacent region 46-1 to the internal space 7 to be less likely to interfere with the high-pressure refrigerant gas that flows obliquely from the upper end opening portion of the through-hole 36-1 toward the rotation axis of the shaft 3. Therefore, the motor part 6 can reduce the resistance received when the high-pressure refrigerant gas flows obliquely from the upper end opening portion of the through-hole 36-1 toward the rotation axis of the shaft 3, and reduce the pressure loss when the high-pressure refrigerant gas flows out from the through-hole 36-1. In the motor part 6, since the upper inner peripheral side adjacent region 46-1 is exposed to the internal space 7, the length of the flow path connecting the lower portion and the upper portion of the motor part 6 via the through-hole 36-1 can further be shortened by the thickness of the upper rotor end plate 33. In the motor part 6, since the length of the flow path is short, the flow path resistance of the high-pressure refrigerant gas passing through the flow path can be reduced, and the pressure loss when the high-pressure refrigerant gas passes through the flow path can be reduced. Regarding the through-holes 36-2 to 36-6, as with the through-hole 36-1, the pressure loss when the high-pressure refrigerant gas passes through the flow path connecting the lower portion and the upper portion of the motor part 6 can be reduced. In the compressor 1, since the pressure loss when the high-pressure refrigerant gas passes through the flow path is reduced, a decrease in pressure of the refrigerant discharged to the subsequent-stage device can be suppressed, and the refrigerant can be compressed with high efficiency.

The refrigerator oil stored in the oil sump 8 is supplied to the compressor part 5 by the rotation of the shaft 3 to be used as lubricating oil that reduces friction acting between mechanical elements constituting the compressor part 5. The refrigerator oil is mixed with the high-pressure refrigerant gas when the compressor part 5 compresses the low-pressure refrigerant gas to generate the high-pressure refrigerant gas, and is supplied to a space between the motor part 6 and the compressor part 5 in the internal space 7. Further, the refrigerator oil is further discharged to the space between the motor part 6 and the compressor part 5 in the internal space 7 by the rotation of the shaft 3, and is mixed with the high-pressure refrigerant gas. A part of the refrigerator oil supplied to the space between the motor part 6 and the compressor part 5 in the internal space 7 passes through the plurality of through-holes 36-1 to 36-6 together with the high-pressure refrigerant gas to be supplied to the space above the motor part 6 in the internal space 7. The refrigerant supplied to the space above the motor part 6 in the internal space 7 is discharged together with the high-pressure refrigerant gas to the subsequent-stage device of the refrigeration cycle apparatus through the discharge pipe 12.

When the refrigerator oil passes through the plurality of through-holes 36-1 to 36-6 together with the high-pressure refrigerant gas, the refrigerator oil collides with the plurality of projection portions 44-1 to 44-6 and 45-1 to 45-6 to be separated from the refrigerant in the plurality of through-holes 36-1 to 36-6. The refrigerator oil separated from the refrigerant in the plurality of through-holes 36-1 to 36-6 is moved to the outer peripheral side of the plurality of through-holes 36-1 to 36-6 by the centrifugal force due to the rotation of the rotor 21, and is collected on the outer peripheral side of the plurality of through-holes 36-1 to 36-6. Here, since the through-holes 36-1 to 36-6 have a V-shape that is separated toward the outer periphery, the refrigerator oil is collected in both of the biforked tip end portions 36-11 to 36-62 of the V-shape. A part of the refrigerator oil collected in the tip end portions 36-11 to 36-62 of the V-shape of the plurality of through-holes 36-1 to 36-6 is supplied to the space between the motor part 6 and the compressor part 5 in the internal space 7 since all of the lower ends of the plurality of through-holes 36-1 to 36-6 are open. In addition, the plurality of projection portions 44-1 to 44-6 and 45-1 to 45-6 suppress that the refrigerator oil collected in the biforked tip end portions 36-11 to 36-62 of the V-shaped opening formed by the upper end of the plurality of through-holes 36-1 to 36-6 is supplied to the space above the motor part 6 in the internal space 7 since the upper end of the plurality of through-holes 36-1 to 36-6 covers the biforked tip end portions 36-11 to 36-62 of the V-shaped opening formed by the upper end of the plurality of through-holes 36-1 to 36-6. In the compressor 1, since it is suppressed that the refrigerator oil is supplied to the space above the motor part 6 in the internal space 7, the oil discharge amount of the refrigerator oil discharged together with the refrigerant to the subsequent-stage device through the discharge pipe 12 is reduced. In the compressor 1, since the oil discharge amount of the refrigerator oil discharged to the subsequent-stage device is reduced, the refrigerator oil stored inside the container 2 can be prevented from being decreased. In the compressor 1, since the refrigerator oil stored inside the container 2 is prevented from being decreased, the lubricating oil can be appropriately supplied to the compressor part 5, and the compressor part 5 can be appropriately lubricated. Further, in the compressor 1, since the oil discharge amount is decreased, the refrigerator oil that does not contribute to heat exchange is less likely to be supplied to a heat exchanger of the refrigeration cycle apparatus, and the heat exchange efficiency of the heat exchanger of the refrigeration cycle can be improved.

Effects of Compressor 1 of First Embodiment

The compressor 1 of the first embodiment includes the rotor 21, the stator 22 that rotates the rotor 21 around the rotation axis, the compressor part 5 that compresses refrigerant by the rotation of the rotor 21, and the container 2 that forms the internal space 7 in which the rotor 21, the stator 22, and the compressor part 5 are housed. The rotor 21 includes the rotor core 31 in which the plurality of through-holes 36-1 to 36-6 through which the refrigerant passes are formed, the through-holes 36-1 to 36-6 having a V-shaped cross section of which the bent portion projects toward the rotation axis, the lower rotor end plate 32 (first end plate) that covers the lower rotor end surface 34 (first end surface) where one end of the both end portions of the through-holes 36-1 to 36-6 of the rotor core 31 closer to the compressor part 5 is formed, and the upper rotor end plate 33 (second end plate) that covers the upper rotor end surface 35 (second end surface) where the other end of the through-holes 36-1 to 36-6 of the rotor core 31 is formed. The lower rotor end plate 32 has the lower opening portion 41 (first opening portion) that causes the through holes 36-1 to 36-6 to communicate with the internal space 7. The upper rotor end plate 33 has the upper opening portion 43 (second opening portion) that causes the through holes 36-1 to 36-6 to communicate with the internal space 7. The upper opening portion 43 exposes the region closer to the rotation axis than the through-holes 36-1 to 36-6 to the internal space 7, and has the projection portions 44-1 to 44-6 and 45-1 to 45-6 that cover the biforked tip end portions 36-11 to 36-62 of the V-shape of the other end.

In such a compressor 1, since the plurality of upper inner peripheral side adjacent regions 43-1 to 43-6 are exposed to the internal space 7, the length of the flow path connecting the lower portion and the upper portion of the motor part 6 via the plurality of through-holes 36-1 to 36-6 can be shortened by the thickness of the upper rotor end plate 33. Therefore, in the compressor 1, since the plurality of upper inner peripheral side adjacent regions 43-1 to 43-6 are exposed to the internal space 7, the flow path resistance of the high-pressure refrigerant gas passing through the flow path can be reduced, and the pressure loss when the high-pressure refrigerant gas passes through the motor part 6 can be reduced. In the compressor 1, since the pressure loss when the high-pressure refrigerant gas passes through the motor part 6 is reduced, the refrigerant can be compressed with high efficiency. In the compressor 1, since the refrigerant is compressed with high efficiency, the efficiency of the refrigeration cycle provided with the compressor 1 can be improved.

Further, the upper rotor end plate 33 of the compressor 1 of the first embodiment has the plurality of projection portions 44-1 to 44-6 and 45-1 to 45-6 that respectively cover the biforked tip end portions 36-11 to 36-62 of the V-shape separated toward the outer periphery of the upper end of the plurality of through-holes 36-1 to 36-6 on the upper rotor end surface 35 side. When the refrigerator oil passes through the plurality of through-holes 36-1 to 36-6 in a state of being mixed with the refrigerant, the refrigerator oil collides with the plurality of projection portions 44-1 to 44-6 and 45-1 to 45-6 to be separated from the refrigerant in the plurality of through-holes 36-1 to 36-6. The refrigerator oil separated from the refrigerant in the plurality of through-holes 36-1 to 36-6 is moved to the outer peripheral side of the plurality of through-holes 36-1 to 36-6 by the centrifugal force due to the rotation of the rotor 21, and is collected in the biforked tip end portions 36-11 to 36-62 of the V-shape of the upper end of the plurality of through-holes 36-1 to 36-6. In such a compressor 1, since the plurality of projection portions 44-1 to 44-6 and 45-1 to 45-6 are formed, it is suppressed that the refrigerator oil collected in the biforked tip end portions 36-11 to 36-62 of the V-shape of the plurality of through-holes 36-1 to 36-6 flows out to a portion above the motor part 6 in the internal space 7. Therefore, the compressor 1 can reduce the amount of refrigerator oil supplied to a portion above the motor part 6 in the internal space 7, and reduce the oil discharge amount of the refrigerator oil discharged together with the refrigerant to the subsequent-stage device. In the compressor 1, even in a case where the plurality of projection portions 44-1 to 44-6 and 45-1 to 45-6 are formed, since the plurality of upper inner peripheral side adjacent regions 43-1 to 43-6 of the upper rotor end surface 35 are exposed to the internal space 7, an increase in pressure loss when the high-pressure refrigerant gas passes through the motor part 6 can be suppressed.

In this way, the refrigerator oil in the plurality of through-holes 36-1 to 36-6 is easily discharged to the internal space 7 on the compressor part 5 side from the lower opening portion 41 of the rotor 21 along the side surfaces of the through-holes 36-1 to 36-6. As a result, the refrigerator oil guided to the internal space 7 on the discharge pipe 12 side of the rotor 21 is decreased. Note that, this effect does not depend on the type of refrigerant gas.

Further, in the compressor 1 of the first embodiment, the plurality of lower inner peripheral side adjacent regions 42-1 to 42-6 of the lower rotor end surface 34 are exposed to the internal space 7. In such a compressor, since the plurality of lower inner peripheral side adjacent regions 42-1 to 42-6 are exposed to the internal space 7, the length of the flow path connecting the lower portion and the upper portion of the motor part 6 via the plurality of through-holes 36-1 to 36-6 can be shortened by the thickness of the lower rotor end plate 32. Therefore, in the compressor 1, the flow path resistance of the high-pressure refrigerant gas passing through the flow path can be reduced, and the pressure loss when the high-pressure refrigerant gas passes through the flow path can be further reduced. In the compressor 1, since the pressure loss when the high-pressure refrigerant gas passes through the flow path is further reduced, the high-pressure refrigerant gas can be discharged with higher efficiency, and the efficiency of the refrigeration cycle provided with the compressor 1 can be further improved.

Further, since a structure in which the region closer to the shaft 3 than the through-holes 36-1 to 36-6 is exposed to the internal space 7 is adopted for the lower side, the refrigerator oil falling down along the side surfaces of the through-holes 36-1 to 36-6 can be more efficiently discharged to the internal space 7 on the compressor part 5 side from the lower opening portion 41.

Further, the upper rotor end plate 33 and the lower rotor end plate 32 of the compressor 1 respectively have one upper opening portion 43 and one lower opening portion 41. Since the each of the upper opening portion 43 and the lower opening portion 41 is formed of one hole, the manufacturing can be easily performed. Since the upper rotor end plate 33 and the lower rotor end plate 32 can be easily manufactured, such a compressor 1 can be easily manufactured as a whole.

Compressor of First Comparative Example

Figure 6A:
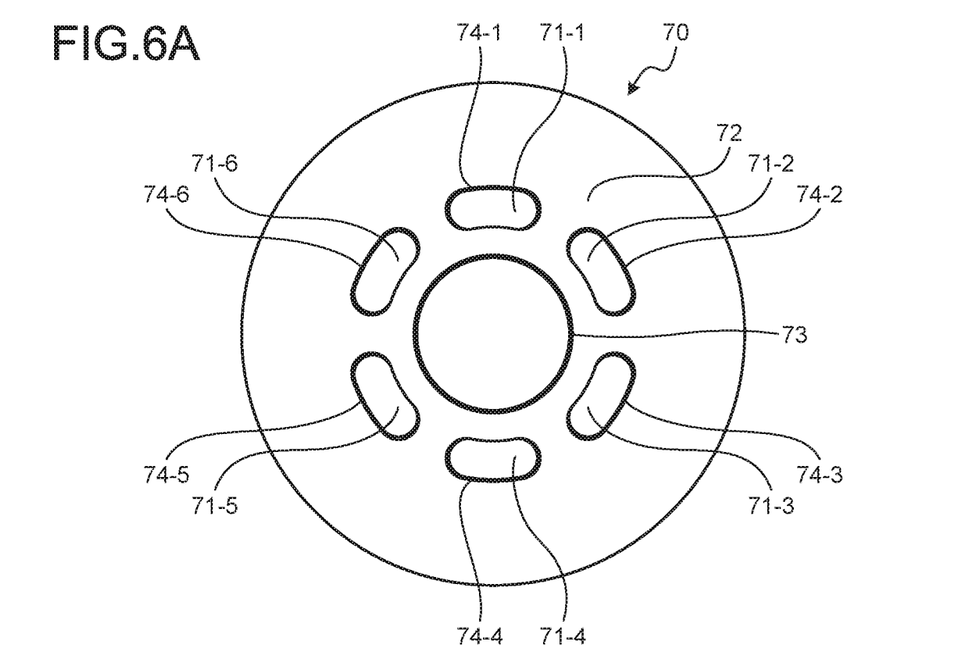
FIG. 6A is a bottom view illustrating a rotor of a compressor of a first comparative example.
Figure 6B:
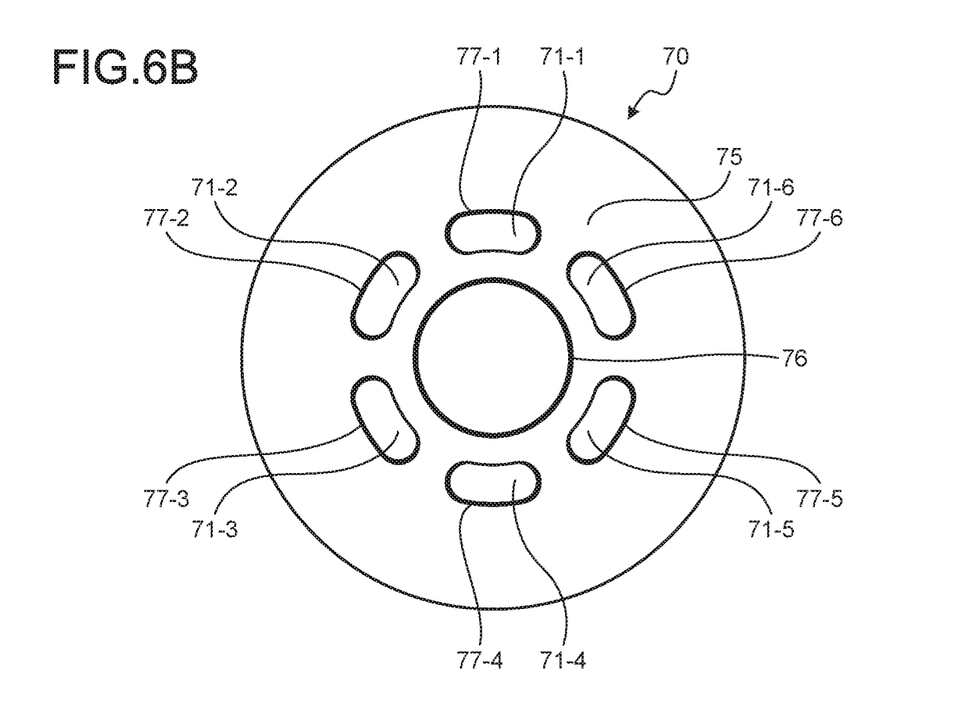
FIG. 6B is a top view illustrating the rotor of the compressor of the first comparative example.

FIG. 6A is a bottom view illustrating a rotor of a compressor of a first comparative example, and FIG. 6B is a top view illustrating the rotor of the compressor of the first comparative example. The compressor of the first comparative example has through-holes 71-1 to 71-6 in a rotor 70 as illustrated in FIG. 6A. The through-holes 71-1 to 71-6 have a shape close to an ellipse. Then, a lower rotor end plate 72 is fixed to a rotor core to be in close contact with a lower rotor end surface so as to cover the lower rotor end surface of the rotor core. Then, the lower rotor end plate 72 has a lower central hole 73 and a plurality of lower opening portions 74-1 to 74-6. The lower central hole 73 is formed in the center of the lower rotor end plate 72.

The plurality of lower opening portions 74-1 to 74-6 are formed around the lower central hole 73. The plurality of lower opening portions 74-1 to 74-6 are formed in the same shape as the cross section where the plurality of through-holes 71-1 to 71-6 intersect the plane orthogonal to the rotation axis of the shaft 3. The plurality of lower opening portions 74-1 to 74-6 allow each of the lower ends of the plurality of through-holes 71-1 to 71-6 to be open to the internal space 7, and causes each of the plurality of through-holes 71-1 to 71-6 to communicate with the internal space 7. The lower rotor end plate 72 further covers all the regions of the lower rotor end surface which are adjacent to the plurality of through-holes 71-1 to 71-6.

Further, as illustrated in FIG. 6B, an upper rotor end plate 75 of the compressor of the first comparative example is fixed to the rotor core to be in close contact with an upper rotor end surface so as to cover the upper rotor end surface of the rotor core. Then, the upper rotor end plate 75 has an upper central hole 76 and a plurality of upper opening portions 77-1 to 77-6. The upper central hole 76 is formed in the center of the upper rotor end plate 75.

The plurality of upper opening portions 77-1 to 77-6 are formed around the upper central hole 76. The plurality of upper opening portions 77-1 to 77-6 are formed in the same shape as the cross section where the plurality of through-holes 71-1 to 71-6 intersect the plane orthogonal to the rotation axis of the shaft 3. The plurality of upper opening portions 77-1 to 77-6 allow each of the upper ends of the plurality of through-holes 71-1 to 71-6 to be open to the internal space 7, and causes each of the plurality of through-holes 71-1 to 71-6 to communicate with the internal space 7. The upper rotor end plate 75 further covers all the regions of the upper rotor end surface which are adjacent to the plurality of through-holes 71-1 to 71-6. Then, the compressor of the first comparative example has the same configuration of the compressor 1 of the first embodiment except for the configuration of the rotor 70 illustrated in FIG. 6.

Figure 7:
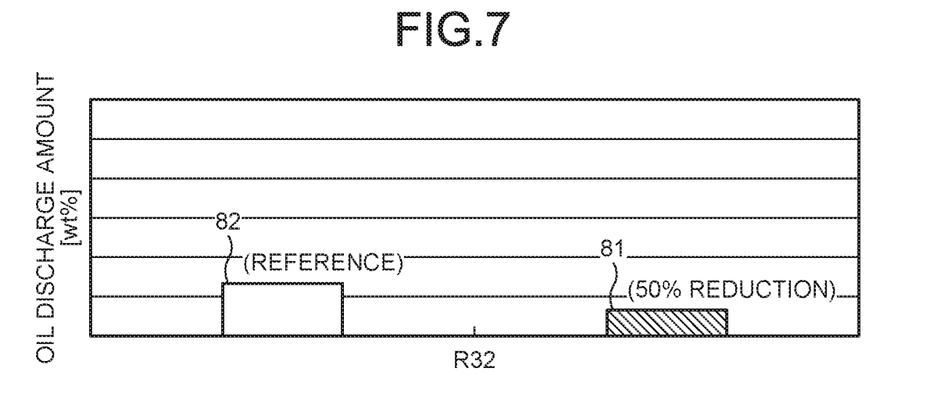
FIG. 7 is a bar graph illustrating an oil discharge amount of the compressor of the first embodiment and an oil discharge amount of the compressor of the first comparative example under a high rotation condition in a case where a heating operation is performed using R32 as a refrigerant.

FIG. 7 is a bar graph illustrating an oil discharge amount of the compressor of the first embodiment and an oil discharge amount of the compressor of the first comparative example under a high rotation condition in a case where a heating operation is performed using R32 as the refrigerant. The oil discharge amount indicates the concentration of the refrigerator oil contained in the refrigerant discharged through the discharge pipe 12. The height of a bar 81 in the bar graph of FIG. 7 indicates the oil discharge amount of the compressor 1 of the first embodiment. The height of a bar 82 indicates the oil discharge amount of the compressor of the first comparative example.

This indicates that the oil discharge amount of the compressor 1 of the first embodiment is smaller than that of the compressor of the first comparative example when the shaft 3 is rotated under the high rotation condition during the heating operation. Specifically, the oil discharge amount of the compressor 1 of the first embodiment is about 50% smaller than the oil discharge amount of the compressor of the first comparative example.

The compressor 1 of the first embodiment has the lower rotor end plate 32 and the upper rotor end plate 33. That is, the upper rotor end plate 33 of the compressor 1 of the first embodiment has the plurality of projection portions 44-1 to 44-6 and 45-1 to 45-6 that cover the biforked tip end portions 36-11 to 36-62 of the openings formed by the upper ends of the plurality of through-holes 36-1 to 36-6. On the other hand, the upper rotor end plate 75 of the compressor of the first comparative example does not have a plurality of projection portions, and allows the through-holes 71-1 to 71-6 to be open to the internal space 7 in a state of covering the entire vicinity of the plurality of through-holes 71-1 to 71-6. Therefore, the bar 81 of the bar graph indicates that the oil discharge amount of the compressor 1 is reduced since the biforked tip end portions 36-11 to 36-62 of the openings formed by the upper ends of the plurality of through-holes 36-1 to 36-6 are covered, and indicates that the amount of the refrigerator oil passing from the lower portion to the upper portion of the motor part 6 through the plurality of through-holes 36-1 to 36-6 is reduced.

In short, the bar 81 and the bar 82 in the bar graph indicate that the oil discharge amount of the compressor 1 of the first embodiment is smaller than the oil discharge amount of the compressor of the first comparative example under the high rotation condition during the heating operation. That is, the bar 81 of the bar graph indicates that the oil discharge amount of the compressor is reduced since the biforked tip end portions 36-11 to 36-62 of the openings formed by the upper ends of the plurality of through-holes 36-1 to 36-6 are covered, and indicates that the amount of the refrigerator oil passing from the lower portion to the upper portion of the motor part 6 through the plurality of through-holes 36-1 to 36-6 is reduced.

Figure 8:
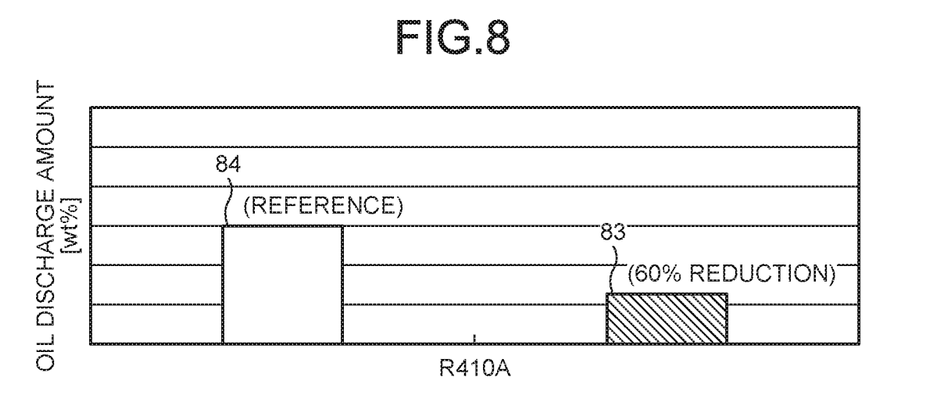
FIG. 8 is a bar graph illustrating an oil discharge amount of the compressor of the first embodiment and an oil discharge amount of the compressor of the first comparative example under a high rotation condition in a case where a heating operation is performed using R410A as a refrigerant.

FIG. 8 is a bar graph illustrating an oil discharge amount of the compressor of the first embodiment and an oil discharge amount of the compressor of the first comparative example under the high rotation condition in a case where a heating operation is performed using R410A as the refrigerant. The oil discharge amount indicates the concentration of the refrigerator oil contained in the refrigerant discharged through the discharge pipe 12. The height of a bar 83 in the bar graph of FIG. 7 indicates the oil discharge amount of the compressor 1 of the first embodiment. The height of a bar 84 indicates the oil discharge amount of the compressor of the first comparative example.

This indicates that the oil discharge amount of the compressor 1 of the first embodiment is smaller than that of the compressor of the first comparative example when the shaft 3 is rotated under the high rotation condition during the heating operation. Specifically, the oil discharge amount of the compressor 1 of the first embodiment is about 60% smaller than the oil discharge amount of the compressor of the first comparative example.

The compressor 1 of the first embodiment has the lower rotor end plate 32 and the upper rotor end plate 33. That is, the upper rotor end plate 33 of the compressor 1 of the first embodiment has the plurality of projection portions 44-1 to 44-6 and 45-1 to 45-6 that cover the biforked tip end portions 36-11 to 36-62 of the openings formed by the upper ends of the plurality of through-holes 36-1 to 36-6. On the other hand, the upper rotor end plate 75 of the compressor of the first comparative example does not have a plurality of projection portions, and allows the through-holes 71-1 to 71-6 to be open to the internal space 7 in a state of covering the entire vicinity of the plurality of through-holes 71-1 to 71-6. Therefore, the bar 81 of the bar graph indicates that the oil discharge amount of the compressor 1 is reduced since the biforked tip end portions 36-11 to 36-62 of the openings formed by the upper ends of the plurality of through-holes 36-1 to 36-6 are covered, and indicates that the amount of the refrigerator oil passing from the lower portion to the upper portion of the motor part 6 through the plurality of through-holes 36-1 to 36-6 is reduced.

In short, the bar 81 and the bar 82 in the bar graph indicate that the oil discharge amount of the compressor 1 of the first embodiment as smaller than the oil discharge amount of the compressor of the first comparative example under the high rotation condition during the heating operation. That is, the bar 81 of the bar graph indicates that the oil discharge amount of the compressor is reduced since the biforked tip end portions 36-11 to 36-62 of the openings formed by the upper ends of the plurality of through-holes 36-1 to 36-6 are covered, and indicates that the amount of the refrigerator oil passing from the lower portion to the upper portion of the motor part 6 through the plurality of through-holes 36-1 to 36-6 is reduced. In this way, the oil discharge amount can be reduced even in a case where either R32 or R410A is used as the refrigerant. That is, the compressor 1 according to the first embodiment can reduce the oil discharge amount without depending on the type of refrigerant.

Here, in the embodiment described above, the case where the plurality of through-holes 36-1 to 36-6 have a V-shape that is divided in a biforked manner has been described, but the number of forks is not particularly limited. In that case, as long as the tip end portions divided in respective forks are covered with the projection portion of the upper rotor end plate 33, it is suppressed that the refrigerator oil flows out to the portion above the motor part 6 in the internal space 7 by the projection portion. Further, the shape of the through-hole is not limited to the V-shape. For example, a part of the outer periphery of the through-hole formed in a circular shape may project to the outer diameter side to have a plurality of tip end portions. Further, the through-hole need not have the tip end portion in a direction toward the outer periphery. In this case, for example, the through-hole may be formed in a circular shape, and the projection portion may be formed in a manner that a part of the opening portion of the rotor end plate extends toward the shaft side.

REFERENCE SIGNS LIST

1 COMPRESSOR
2 CONTAINER
5 COMPRESSOR PART
6 MOTOR PART
7 INTERNAL SPACE
21 ROTOR
22 STATOR
31 ROTOR CORE
32 LOWER ROTOR END PLATE
33 UPPER ROTOR END PLATE
34 LOWER ROTOR END SURFACE
35 UPPER ROTOR END SURFACE
36-1 to 36-6 PLURALITY OF THROUGH-HOLES
37-1 to 37-6 PLURALITY OF PERMANENT MAGNETS
41 LOWER OPENING PORTION
42-1 to 42-6 PLURALITY OF LOWER INNER PERIPHERAL SIDE ADJACENT REGIONS
43 UPPER OPENING PORTION
44-1 to 44-6, 45-1 to 45-6 PLURALITY OF PROJECTION PORTIONS
46-1 to 46-6 PLURALITY OF UPPER INNER PERIPHERAL SIDE ADJACENT REGIONS
70 ROTOR
71-1 to 71-6 PLURALITY OF THROUGH-HOLES
72 LOWER ROTOR END PLATE
73 LOWER CENTRAL HOLE
74-1 to 74-6 PLURALITY OF LOWER OPENING PORTIONS
75 UPPER ROTOR END PLATE
76 UPPER CENTRAL HOLE
77-1 to 77-6 PLURALITY OF UPPER OPENING PORTIONS

The invention claimed is:

1. A compressor comprising:
a rotor;
a stator that rotates the rotor around a rotation axis;
a compressor part that compresses refrigerant by rotation of the rotor; and
a sealed container that forms an internal space in which the rotor, the stator, and the compressor part are housed,
wherein the rotor has
a rotor core in which a plurality of holes through which the refrigerant passes are formed,
a first end plate that covers a first end surface where one end of both end portions of the plurality of holes of the rotor core closer to the compressor part is formed, and
a second end plate that covers a second end surface where the other end of the plurality of holes of the rotor core is formed,
the first end plate has a first opening portion that causes the plurality of holes to communicate with the internal space,
the second end plate has a second opening portion that causes the plurality of holes to communicate with the internal space, and
a plurality of projection portions that cover a region of the other end of the hole distant from the rotation axis are formed.

2. The compressor according to claim 1,
wherein the hole has a cross section having a V-shape of which a bent portion projects toward the rotation axis,
the second opening portion exposes a region closer to the rotation axis than the plurality of holes to the internal space, and
the projection portion that covers tip end portions at both ends of the V-shape formed on the other end of the hole is formed.

3. The compressor according to claim 1, wherein the second opening portion is formed of one hole that causes all of the plurality of holes to communicate with the internal space.

4. The compressor according to claim 1, wherein the first opening portion is formed of one hole that causes all of the plurality of holes to communicate with the internal space.

5. The compressor according to claim 4, wherein the first opening portion exposes the hole and a partial region of the rotor core adjacent to the hole in a circumferential direction to the internal space.

* * * * *